J. W. MEAKER.
FLUSH TANK VALVE MECHANISM.
APPLICATION FILED APR. 27, 1914.

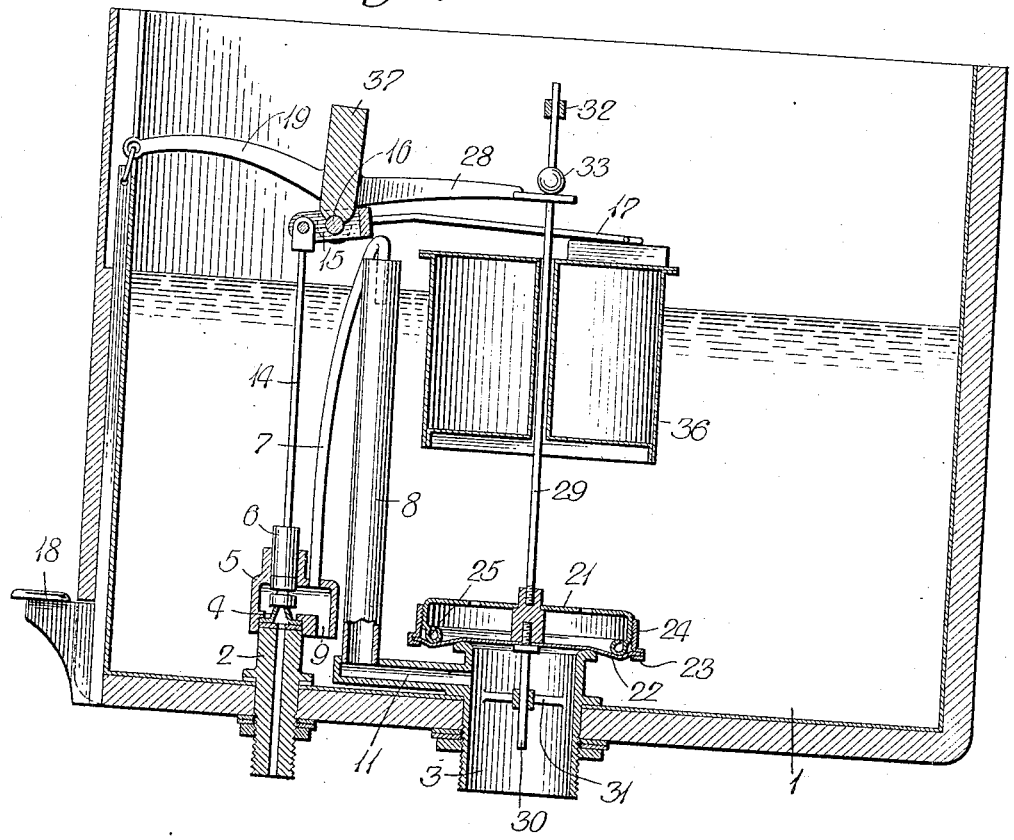
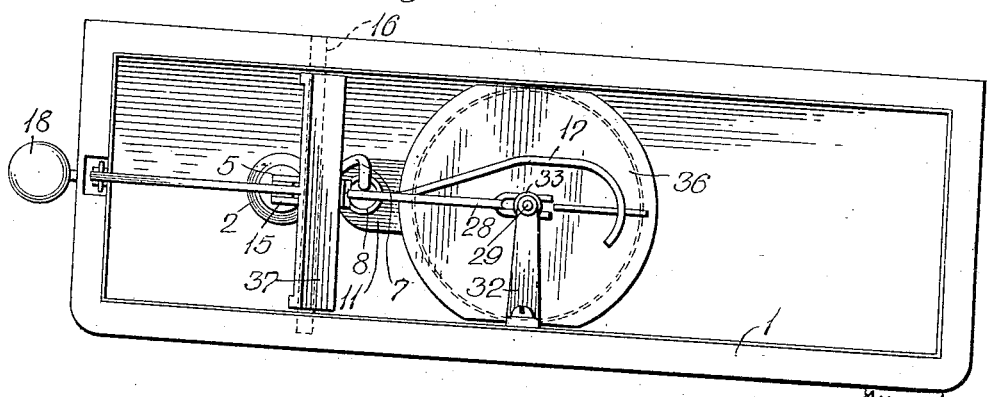

1,238,317.
Patented Aug. 28, 1917.
4 SHEETS—SHEET 2.

Witnesses
Chas. W. Stauffiger
Anna M. Dorr

Inventor
John W. Meaker,
By Barthel & Barthel
Attorneys

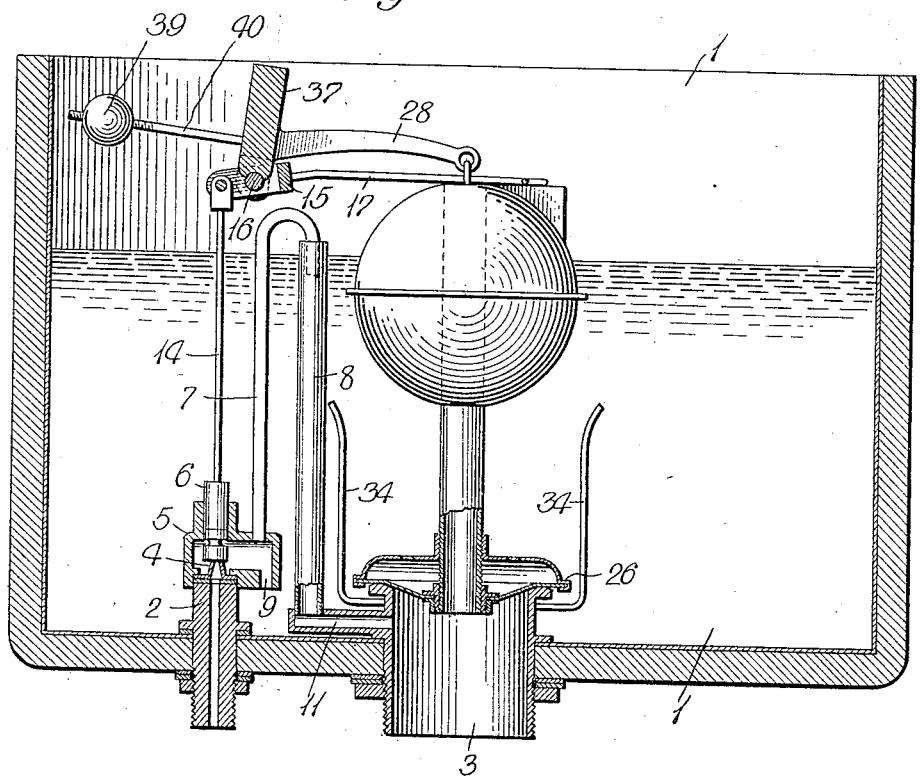
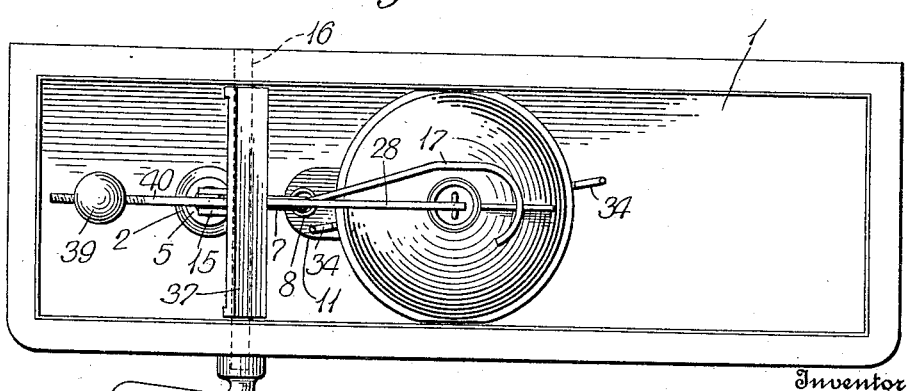

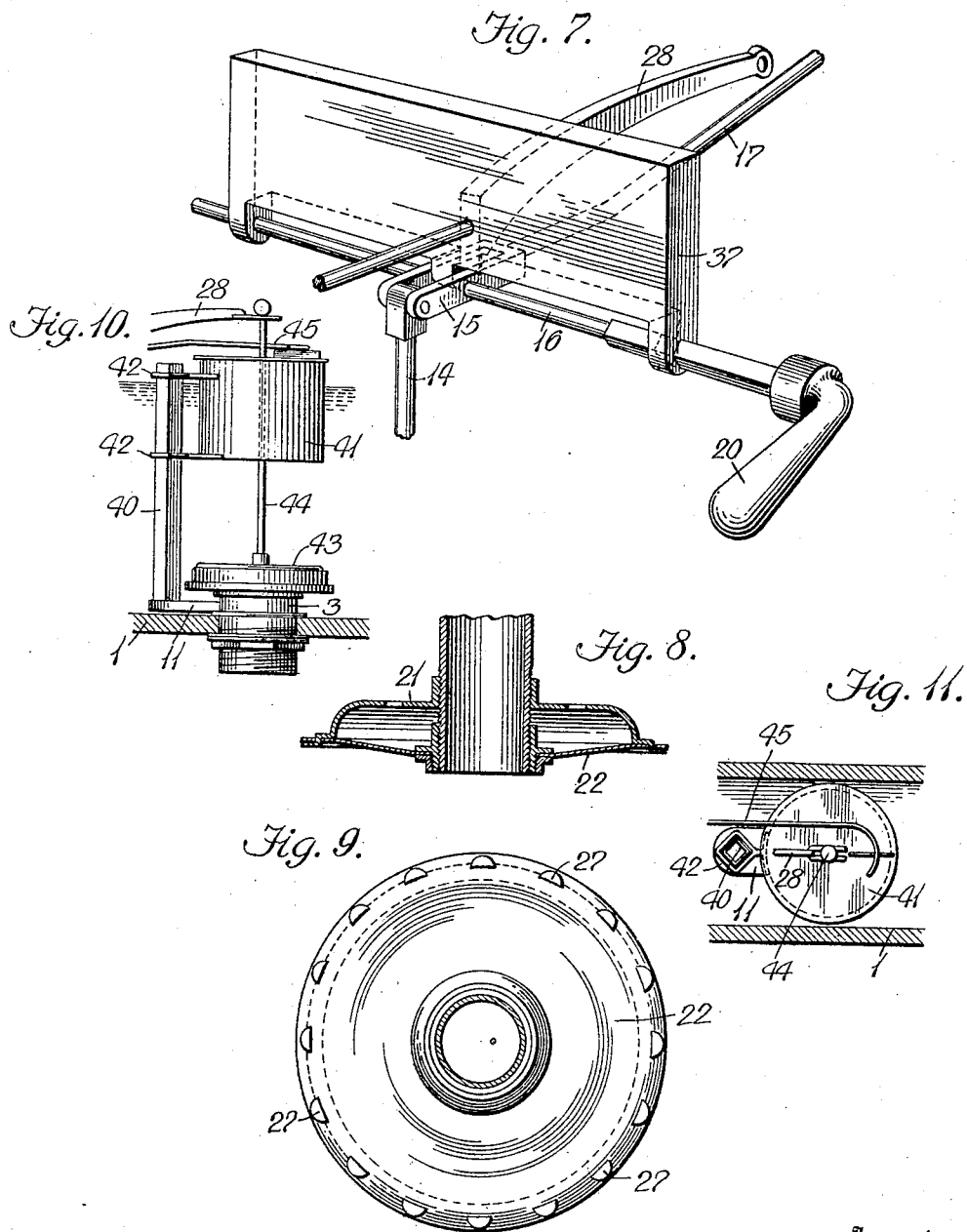

UNITED STATES PATENT OFFICE.

JOHN W. MEAKER, OF DETROIT, MICHIGAN.

FLUSH-TANK VALVE MECHANISM.

1,238,317.   Specification of Letters Patent.   Patented Aug. 28, 1917.

Application filed April 27, 1914. Serial No. 834,563.

*To all whom it may concern:*

Be it known that I, JOHN W. MEAKER, a citizen of the United States of America, residing at Detroit, in the county of Wayne and State of Michigan, have invented certain new and useful Improvements in Flush-Tank Valve Mechanism, of which the following is a specification, reference being had therein to the accompanying drawings.

In the operation of valve mechanism for flush tanks, as ordinarily constructed the shut off is dependent upon the movement of a ball closure or the like which seals the outlet to the tank at an indeterminate point that varies according to the influx of the water. The intake valve is also controlled usually by a float operating independently of the outlet mechanism. This results in irregularity in the amount of water discharged from the tank and complicates the mechanism.

This invention relates to valve mechanism for flush tanks and to means whereby a single float positively controls both the outlet or waste valve closure and the inlet or feed valve, the parts being so arranged as to minimize the number and diminish the liability to disarrangement under service.

The invention consists in the matters hereinafter set forth and more particularly pointed out in the appended claim.

In the drawings,

Figure 1 is a view in transverse section of a flush tank equipped with mechanism that embodies features of the invention showing the parts in closed position that is assumed when the tank is full;

Fig. 2 is a plan view of the tank and mechanism;

Fig. 5 is a view in transverse section of a flush tank showing a further modification of the device and more particularly of means for opening the flush valve;

Fig. 6 is a plan view of this further modification;

Fig. 7 is a view in detail of one form of counter-balance weight and operating handle;

Figs. 8 and 9 are views in detail of a preferred form of waste valve closure;

Fig. 10 is a reduced view in detail of a preferred arrangement of float mechanism and valve that eliminates exterior guides and simplifies the entire construction; and Fig. 11 is a plan view of the preferred float construction.

Figure 3:
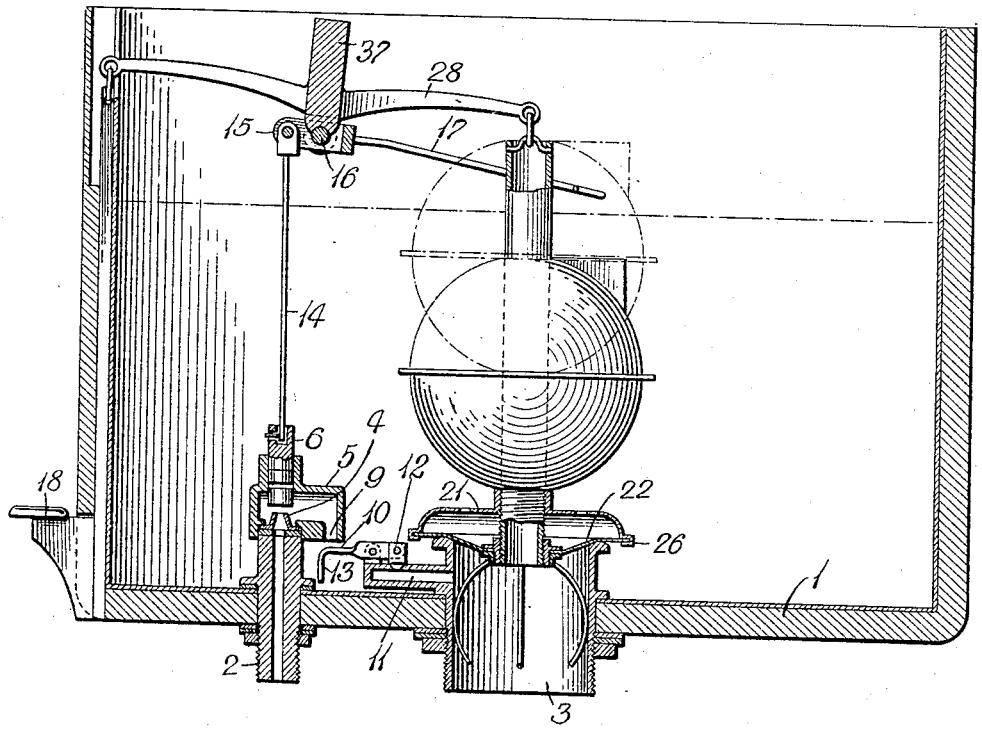
Fig. 3 is a view in vertical section through the flush tank equipped with a modification of the mechanism, showing the parts in the position assumed as the tank is fully emptied.
Figure 4:
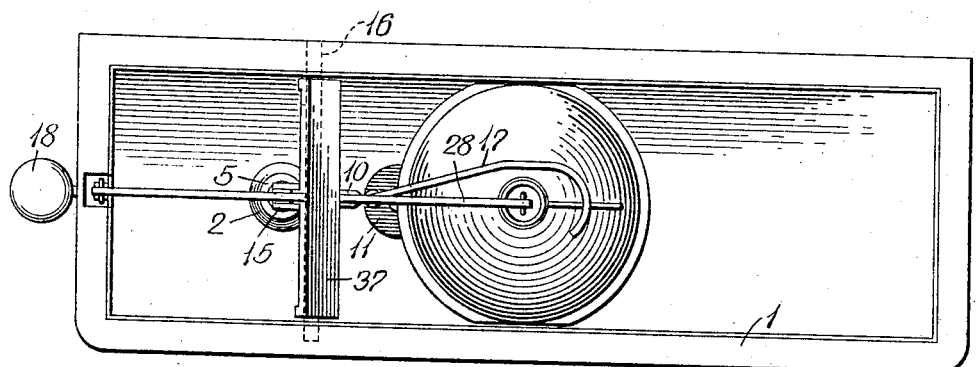
Fig. 4 is a plan view of this modification.

Referring to the drawings a flush tank 1 is provided with water through an inlet valve 2 and with an outlet 3 both through openings in the tank base, with the usual means for insuring a tight joint. Preferably the inlet valve includes an upwardly discharging nipple 4 covered by a bonnet 5 in which a vertically reciprocable plug 6 moves in such manner as to seat on the nipple 4. As indicated in Figs. 1 and 5 a dribble pipe 7 leads from the upper part of the bonnet and discharges into an upright overflow pipe 8 that is in suitable communication with the outlet 3. Or the outlet 9 of the bonnet which in all instances preferably discharges toward the base of the tank may be disposed so that the inrush of water when the valve is open impinges against a finger 10. The latter is pivoted between its ends on a hollow extension 11 of the outlet 3 according to the constructions shown in Fig. 3 with a closure 12 thereon that normally seals the dribble opening into the extension, but opens the latter when the finger is depressed by the incoming current of water. As a good detail of construction the movement of the finger 10 may be limited by the use of a downturned end portion 13 as a stop. The plug 6 is articulated as by a link 14 with a rock arm 15 which is preferably pivoted on a main operating shaft 16 journaled transversely across the tank above the level of the contents of the latter. A trip member 17 extends outwardly from the opposite part of the rock arm 15 over the outlet 3.

The shaft may be depressed by a suitable push member 18 connected to an arm 19 extending from the shaft as indicated in Figs. 1 and 3 or may be turned by means of a handle 20 applied directly to the shaft end as shown in Figs. 6 and 7.

The upper end of the outlet 3 which stands at an interval above the tank base is flanged or otherwise arranged to form an annular valve seat which may be sealed by a closure preferably having an inverted shell 21 whose lower open end is closed by a diaphragm 22 of flexible material. The latter as indicated in Fig. 1, may be clamped at its margins in the flange 23 of a collar 24, (Fig. 1) that is screwthreaded on to the shell whereby the diaphragm may be stretched more or less tightly over the rounded margin 25 of the shell. Or as indicated in Figs. 3 and 5 the diaphragm 22 may be merely clamped in a marginal flange 26 of the shell. Another form of construction is shown in Figs. 8 and 9 in which the diaphragm is apertured to be stretched over lugs 27 in the margin of the shell, the lugs then being outturned as indicated to hold the diaphragm in place.

An arm 28 that extends from the shaft 16 is connected near its outer end to a stem 29 whose lower end is secured to the shell 21 and is provided with an extension 30 below the diaphragm 22 which, as indicated in Fig. 1, passes through a guide member 31 in the outlet 3. A suitable guide bracket 32 (Fig. 1) may also serve to keep the stem in upright position. This construction of the guiding members is preferable where the outer end portion of the lever 28 is forked to loosely embrace the stem and lift it by means of an overlying ball 33 thereon. The stem, however, may be hollow as indicated in Figs. 3 and 5 for example, with its upper end loosely articulated to the apertured end of the lever arm 28 while the shell 21 either has depending guide fingers or else is loosely centered over the outlet by upright guide arms 34 (Fig. 5).

A float 36 of suitable form is reciprocable on the stem 29, and is of such proportions that when the contents of the tank is at a predetermined level it bears upwardly against the trip 17 with sufficient force to hold the plug 6 seated on the inlet nipple 4 and thereby shut off the water supply. When the contents of the tank is discharged the float is adapted to drop upon the closure 21 and seat the latter.

In order that the outlet valve may remain open after the push member 18 or corresponding handle 20 has been momentarily depressed without further attention on the part of the operator, a weight member 37 is mounted on the shaft 16 to tilt with the oppositely extending arms 19 and 28 so that when the arm 19 is depressed the weight falls in that direction and thereby overbalances the outlet valve and its stem. As the contents of the tank is thereby discharged the float 36 recedes from the trip 17 thereby permitting the pressure of water against the plug 6 to unseat the latter and commence to fill the tank. When the float strikes the shell 21 in its downward course it seats the latter and holds it until sufficient pressure of the rising contents of the tank is established to keep it in place, the float being so proportioned in weight that it overcomes the counterbalance 37 and returns the latter to initial position.

As a detail of good mechanical construction the arms 19 and 28 may be formed integrally with the counterbalance 37 as shown and, as indicated in Fig. 5 where the arm 19 is omitted because of the use of the handle 20 instead of the push member 18, an adjustable counter-poise 39 may be added with suitably arranged rod 40 for accurate adjustment in balance between the float and the counterbalance. It is to be further understood that the mechanical details such as connections between the parts and their general form may be varied within the limits of good shop practice.

One such variation that eliminates the use of the guiding means for the outlet closure and float is indicated in the preferred form of construction shown in Figs. 10 and 11 in which the outlet 3 has an exteriorly squared, polygonal or splined upright waste pipe 40'. A suitably designed float 41 has guides 42 extending therefrom that loosely slide upon the waste pipe 40' and thereby hold the float in substantially axial alinement with the outlet 3. A closure shell 43 for the outlet is provided with an upright stem 44 which is guided by sliding engagement through a tubular opening through the float and is loosely engaged at its upper end to an operating member from the main shaft. This arrangement holds the float and closure in position both for controlling the outlet closure and for moving a trip member 45.

As a result of this construction a valve mechanism is obtained that is positive in action, that is easily adjusted and that is maintained in operative condition with little trouble. The closure for the outlet is held open until the downward movement of the float depresses it so that it does not vary in relation to the discharge of the tank as does the usual float or globe closure in common use. As the diaphragm of the closure is readily replaced it does not necessitate the replacement of the outlet valve as is the case where the ordinary collapsible bulb closure is used.

Obviously, changes in the details of construction may be made without departing from the spirit of my invention and I do not care to limit myself to any particular form or arrangement of parts.

What I claim is:—

A flush tank provided with an inlet and an outlet, a vertically reciprocable closure over the outlet provided with depending resilient guiding members engaging the outlet walls and an upright hollow stem opening through the closure, a float longitudinally reciprocable on the stem adapted to seat the closure to seal the outlet when the tank empties, a shaft secured in the tank transversely to the stem, manually operable means oscillatory on the shaft adapted to engage the outlet closure stem for raising the latter, a valve for the inlet adapted to open under pressure of incoming fluid, a rock arm on the shaft operatively connected to the inlet valve closure and arranged to lie in the path of upward motion of the float to close the valve as the float approaches its upward limit of motion, and a weight member on the outlet valve operating arm so balanced as to hold the outlet closure in open position until the latter is depressed by the float and then to retain the outlet closure in seated position until shifted manually to its other limit of motion.

In testimony whereof I affix my signature in presence of two witnesses.

JOHN W. MEAKER.

Witnesses:
C. R. STICKNEY,
A. M. DORR.

Copies of this patent may be obtained for five cents each, by addressing the "Commissioner of Patents Washington, D. C."